US005287098A

United States Patent [19]

Janssen

[11] Patent Number: 5,287,098

[45] Date of Patent: Feb. 15, 1994

[54] FAIL SAFE SYSTEM FOR A MECHANICAL LOCK AND KEY SET WITH ELECTRICAL INTERLOCK

[75] Inventor: David C. Janssen, Whitefish Bay, Wis.

[73] Assignee: Briggs & Stratton Corp., Millwaukee, Wis.

[21] Appl. No.: 946,017

[22] Filed: Sep. 15, 1992

Related U.S. Application Data

[63] Continuation of Ser. No. 654,068, Feb. 11, 1991, abandoned.

[51] Int. Cl.$^5$ .................. H04Q 1/00

[52] U.S. Cl. .................. 340/825.31; 340/825.34; 70/278; 70/237; 235/492

[58] Field of Search .................. 340/825.31, 825.32, 340/825.34; 307/10.3; 70/278, 237; 235/492; 361/56, 111

[56] References Cited

U.S. PATENT DOCUMENTS

| | | | |
|---|---|---|---|
| 3,787,714 | 1/1974 | Resnick et al. | 340/825.31 |
| 3,921,040 | 11/1975 | Clarke | 340/825.31 |
| 4,196,347 | 4/1980 | Hadley | 340/825.31 |
| 4,250,482 | 2/1981 | Kouchich et al. . | |
| 4,546,266 | 10/1985 | Zenick et al. | 307/10.2 |
| 4,692,834 | 9/1987 | Iwahashi et al. | 361/56 |
| 4,891,636 | 1/1990 | Ricker | 340/825.31 |
| 4,916,333 | 4/1990 | Kowalski | 340/825.31 |
| 4,990,906 | 2/1991 | Kell et al. | 340/825.31 |
| 5,006,843 | 4/1991 | Hauer | 340/825.31 |
| 5,014,049 | 5/1991 | Bosley | 340/825.31 |
| 5,083,362 | 1/1992 | Edgar et al. . | |
| 5,156,032 | 10/1992 | Edgar . | |
| 5,186,031 | 2/1993 | Janssen et al. . | |
| 5,202,580 | 4/1993 | Janssen . | |

OTHER PUBLICATIONS

"Microelectronic Circuit" Sedra and Smith p. 432 1982.

*Primary Examiner*—Sandra L. O'Shea
*Assistant Examiner*—Brian Zimmerman
*Attorney, Agent, or Firm*—Andrus, Sceales, Starke & Sawall

[57] ABSTRACT

A mechanical key and lock set with a rotating cylinder includes an electronic interlock which is responsive to the insertion of a mated key in the cylinder and proper rotation of the cylinder. A sensor is placed in communication with the cylinder and senses proper rotation of the cylinder to generate an activation signal. Systems controlled by the lock cannot be enabled without the generation of the activation signal. Fail safe blocking circuitry is placed in communication with the activation signal generator and in the event the actuation signal is attempted to be read in an unauthorized manner without properly rotating the cylinder, the blocking circuitry is functional to preclude reading.

10 Claims, 3 Drawing Sheets

FAIL SAFE SYSTEM FOR A MECHANICAL LOCK AND KEY SET WITH ELECTRICAL INTERLOCK

This application is a continuation of Ser. No. 07/654,068, filed Feb. 11, 1991, now abandoned.

BACKGROUND OF THE INVENTION

This invention is generally related to lock and key sets having a rotating cylinder lock and is particularly directed to an electronic interlock to be used in conjunction with a rotating cylinder lock mechanism.

Over the last several years, it has become increasingly desirable to improve the anti-tampering features of lock and key sets. This is particularly true with respect to automobile ignition systems where auto theft has almost developed into an art form. Skilled thieves can often "hot wire" an automobile ignition in a matter of a few seconds. Typically, the key and cylinder lock for engaging and energizing the ignition system is either bypassed or pulled in order to facilitate the theft. To combat this, automotive manufacturers have incorporated a variety of vehicular anti-tampering systems (VATS) to make vehicle theft more difficult. Numerous of these include electrical or electronic interlocks working in cooperation with a mechanical lock system. For example, one such system includes a resistor element on the mechanical key and a circuit connection contained within the cylinder of the key lock. When a mated key with the proper resistance level is inserted in the cylinder, the circuit is closed and the proper coded voltage is produced, permitting the ignition to energize in typical fashion when the cylinder is rotated. If a key with an improper resistance level is used, the proper voltage is not produced and rotation of the cylinder will not enable the ignition system.

In another example, a sensor is placed at a certain point in the rotation of the cylinder and senses proper rotation of the cylinder to produce an ignition activation signal. Any attempt to start the ignition without first properly rotating the cylinder is ineffective since proper rotation is required to generate the ignition activation signal. Efforts have been made to override the electronic interlock by deciphering the coded resistance values and duplicating them in order to engage the ignition.

With the development and availability of onboard computer systems, electronic interlocks are becoming more widely available and more sophisticated at a rapid rate. For example, if an attempt is made to duplicate a resistance level required to deactivate an electronic interlock, and the attempt is not successful, the computer system can be programmed to shut down the ignition circuitry for a delay period of 2.5 minutes more or less. If ten resistance levels are available for a particular car system, the thief must try as many as ten different duplicates before he can be assured of starting the car. On the average, this would increase the amount of time it takes to "hot wire" a car from a few seconds to ten to fifteen minutes or more. In many cases, a ten minute delay is more than sufficient to foil a theft attempt.

While the need for VATS ignitions in automobiles has created the development of the electronic interlock technology, it will be readily apparent that there is a wide variety of uses for which the interlock systems can be incorporated. The electronic interlock systems for vehicle ignition circuits are readily adaptable to any lock and key set utilizing a key with a rotating cylinder lock.

While the systems of the prior art have greatly enhanced the anti-theft features of lock systems, it is desirable to improve upon the systems by making it more difficult, if not impossible, for a thief to read and decode the electronic or resistance level codes utilized in connection with the interlock. In this regard, developing technology includes a fail safe system in combination with the interlock for precluding unauthorized decoding of the interlock code by blocking the signal whenever an attempt is made to unlock the lock in an unauthorized manner. One example of such a system is illustrated as prior art in FIG. 1 of the drawing. As there shown, an electronic interlock system comprising a sensor circuit in series with a coded resistor and a fail safe system is coupled to a VATS module provided by the automobile manufacturer. When a mated key is inserted in the ignition lock cylinder and the cylinder is rotated, a specific point on the cylinder passes by a sensor generating a readable signal which is introduced into the comparator circuit of the VATS module. When the signal is first received by the comparator, it is programmed into the memory and thereafter, the generated signal is compared with the stored signal to determine the presence of an acceptable ignition sequence. Upon an acceptable comparison, the ignition circuitry and fuel delivery system are energized and the vehicle may be started. The fail safe system of FIG. 1 includes a diode in series with the coded resistor for precluding unauthorized reading of the resistor level when a reverse voltage is placed across terminals B and C. While this system is successful in precluding the unauthorized reading of the coded resistor, it has several disadvantages. First, by using a fail safe system that is in series with the coded resistor, the voltage drop across the diode becomes part of the decoded signal read by the reader. In addition, most semi-conductor diodes are temperature sensitive, the coded signal varies substantially depending on ambient conditions. This requires that the width for each coded signal be increased, reducing the number of codes available to the interlock.

SUMMARY OF THE INVENTION

The subject invention provides for a fail safe blocking system which overcomes the disadvantages of the prior art. In its preferred forms, the fail safe system of the invention is in parallel with the coded signal generator. During proper operation, the fail safe circuit of the present invention is nonfunctional and is bypassed so that it does not affect the value of the coded signal. When an attempt is made to read the coded signal in an unauthorized manner, the fail safe circuitry of the subject invention is activated to block access to or override the signal produced by the coded signal generator of the interlock system.

In the preferred embodiments of the invention, the blocking circuit is disposed in parallel with the coded signal generator or a reflective circuit design is used, rather than placing the blocking circuit in series with the coded signal generator as in the prior art. The blocking circuitry is designed to render impossible the reading of the coded signal generator when unauthorized tampering occurs. This prohibits unauthorized determination of the encoded signal, making it difficult, if not impossible, to duplicate the signal and override the interlock to unlock and energize the controlled system.

In one embodiment of the invention, the coded signal generator is placed in parallel with a passive resistor and a blocking diode, wherein the diode blocks current through the passive resistor when the circuitry is in a normal operating condition but allows current to pass through the passive resistor when a reverse voltage is supplied across available terminals in an effort to read the coded signal. This makes the reading of the coded signal virtually impossible without physical destruction of the interlock circuitry.

In a second embodiment of the invention, the coded signal generator is placed in parallel with a passive resistor which is in series with a transistor switch. The coded signal generator is activated when the circuitry is utilized in the authorized, proper fashion. The transistor switch is only activated whenever a reverse voltage is placed on the available terminals in an effort to read the coded resistor.

In yet another embodiment of the invention, one or more operational amplifiers are used in conjunction with the coded signal generator to provide a reflective circuit for reflecting the coded signal during normal operation. This isolates the coded signal generator, making it impossible to read the coded signal by applying reverse voltage to the output terminals of the interlock system.

It is a particular advantage of the electronic interlock system of the present invention that the components associated with the fail safe circuitry are less susceptible to outside factors such as temperature change during normal operation.

It is, therefore, an object and feature of the present invention to provide for fail safe blocking circuitry to be used in conjunction with an electronic interlock for a mechanical lock system, utilizing blocking circuit components which do not interfere with the interlock circuitry during normal operation.

It is another object and feature of the present invention to provide for an electronic interlock system for a mechanical lock which includes blocking circuitry rendering it difficult, if not impossible, to determine the value of an encoded circuit element by unauthorized means.

Other objects and features of the invention will be readily apparent from the accompanying drawing and detailed description of the preferred embodiments.

DETAILED DESCRIPTION OF THE PREFERRED EMBODIMENTS

Figure 1:
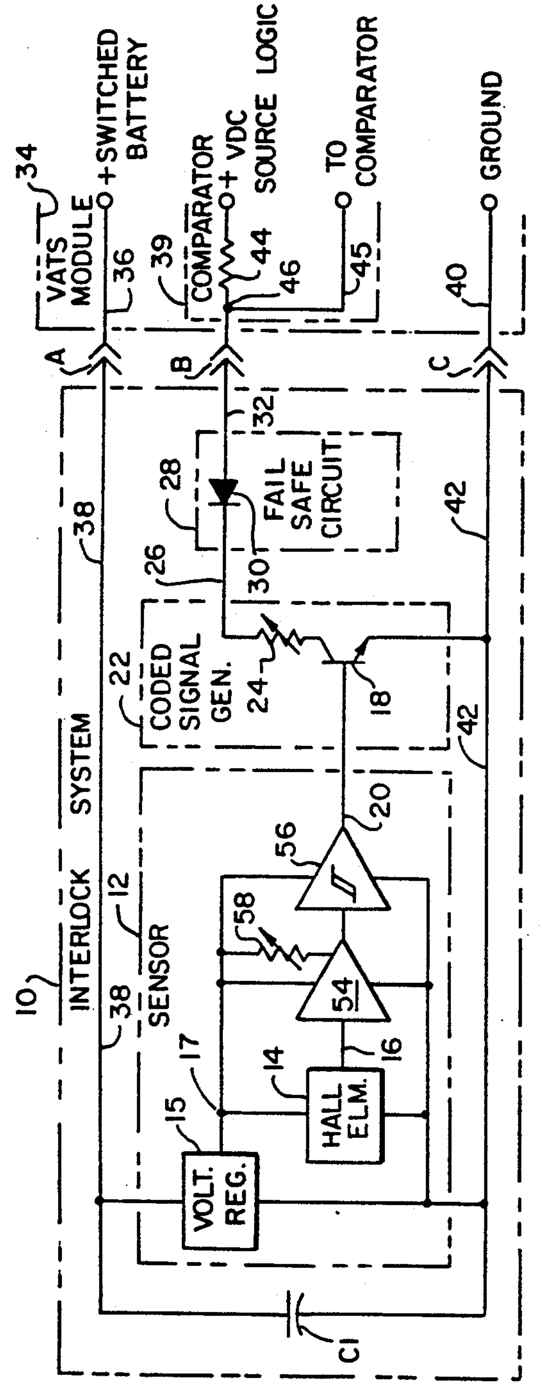
FIG. 1 (PRIOR ART)
FIG. 1 is an illustration a prior art electronic interlock system with an in-series fail safe blocking diode.

First, with reference to the prior art as illustrated in FIG. 1, the electronic interlock system 10 typically includes a sensor circuit 12 having a sensing element such as the Hall effect sensor 14 which is in magnetic communication with the rotating cylinder of the lock set. In typical operation, a magnet is placed on the periphery of the cylinder at a preselected point and as the cylinder is rotated from the locked to the unlocked position, the magnet passes in the proximity of the Hall effect element to generate an output signal on line 16 for activating the Schmitt trigger 56. This produces a signal at line 20 which is introduced into the coded signal generator 22. The sensor circuit 12 includes a voltage regulator 15 to provide an accurate and consistent voltage output on line 17 which is introduced into the Hall effect sensor 14. An amplifier 54 is provided in series with latching circuit such as, by way of example, a Schmitt trigger 56 in combination with a gain control potentiometer 58. The output of the Schmitt latching circuit trigger is introduced into the coded signal generator 22 via line 20. The coded signal generator 22 includes a transistor switch 18 in combination with the coding resistor 24. The transistor switch 18 is switched ON by the presence of a signal on line 20 in response to the movement of the cylinder magnet into the proximity of the Hall effect sensor 14. The resulting voltage drop across resistor 24 produces a coded ignition activation signal on line 26, which is introduced to the fail safe blocking circuit 28 and is output from the circuit 28 to terminal B via the interlock system output line 32.

In the embodiment of FIG. 1, the voltage drop across the resistor 24 produces an output at line 26. The resistor 24 is a preselected resistor of predetermined value for defining the coded signal. The fail safe circuitry 28 comprises the diode 30 in series with the resistor 24. In typical use, the interlock system is coupled directly to a standard vehicular anti-tampering system (VATS) module 34 provided by the vehicle manufacturer. Typically, a switched battery lead 36 is connected directly to the power line 38 of the interlock system via terminal A to provide power to the interlock circuitry. The coded output line 32 is coupled to comparator circuitry 39 provided in the VATS module via terminal B. A common analog ground lead 40 is tied to the ground line 42 of the interlock system at terminal C. A noise suppression capacitor C1 is coupled between the power line 38 and 42 and operates in the manner well known to those who are skilled in the art. The comparator circuit 39 includes a resistor 44, typically approximately 2.5 k ohms and an analog signal line 45 tied to the resistor 44 at junction 46.

During operation, a mated key is inserted in the ignition lock cylinder and the cylinder is rotated from the OFF position through the ON/RUN position and to the START position. The magnet (not shown) on the cylinder passes in the proximity of the Hall effect sensor 14 and generates a signal for energizing the transistor 18. The voltage drop across the coding resistor 24 produces a coded ignition activation signal on line 26 which is passed through the diode 30 and output at line 32 of the interlock system. The coded signal 32 is introduced into the comparator circuit 39 of the VATS module 34 which enables the ignition and the vehicle on-board computer which controls the fuel system. If the coded signal is within a prescribed window as defined by the VATS module, the ignition circuitry is energized, the fuel system is activated and the vehicle may be started. If the coded signal is outside the window, the ignition circuitry is not energized, the fuel system is not actuated and the vehicle cannot be started. The fail safe circuitry 28 precludes direct reading of the coding resistor 24. If a reverse voltage is placed across terminals B and C in an attempt to read the resistor through the transistor 18, the diode 30 blocks the signal and precludes any reading. One major disadvantage with this circuit is that the diode 30 is always in the coded signal loop. The effects of the diode must be taken into consideration when the circuit is operable. Since diodes are susceptible to temperature variations and other environmental concerns to a greater degree than the coded signal generator per se, the presence of the series diode has a detrimental impact on the flexibility and reliability of the system.

Figure 2:
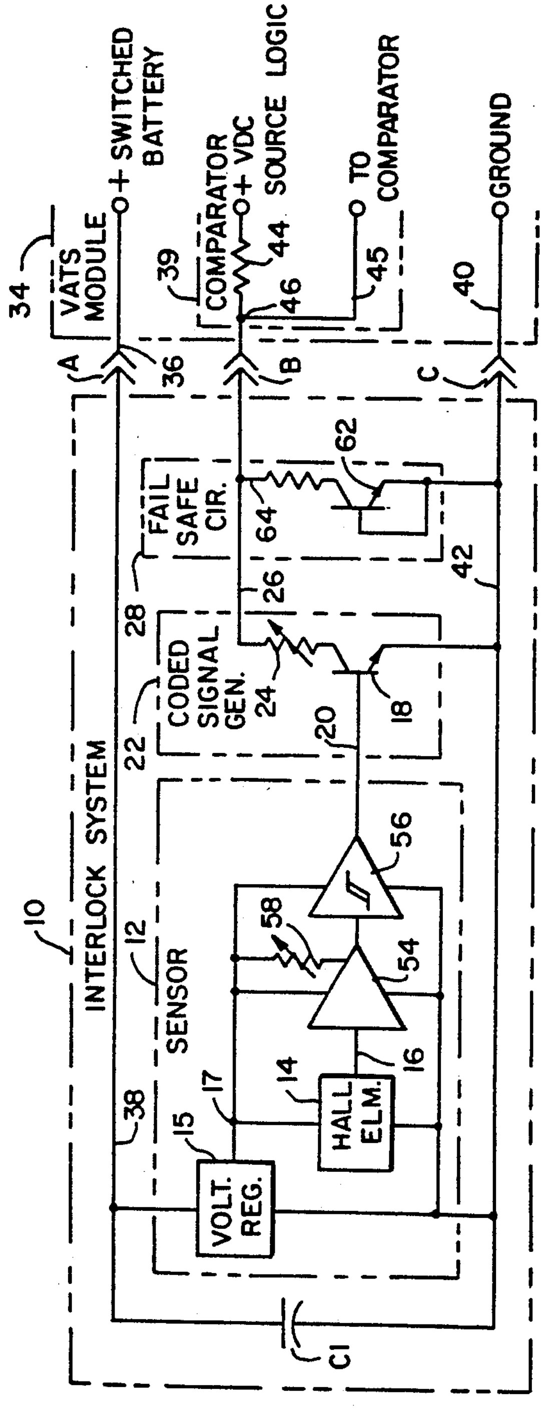
FIG. 2 is a diagrammatic illustration of an electronic interlocking circuity with a transistor switched fail safe blocking circuit in parallel with the coded signal generator, in accordance with the present invention.
Figure 3:
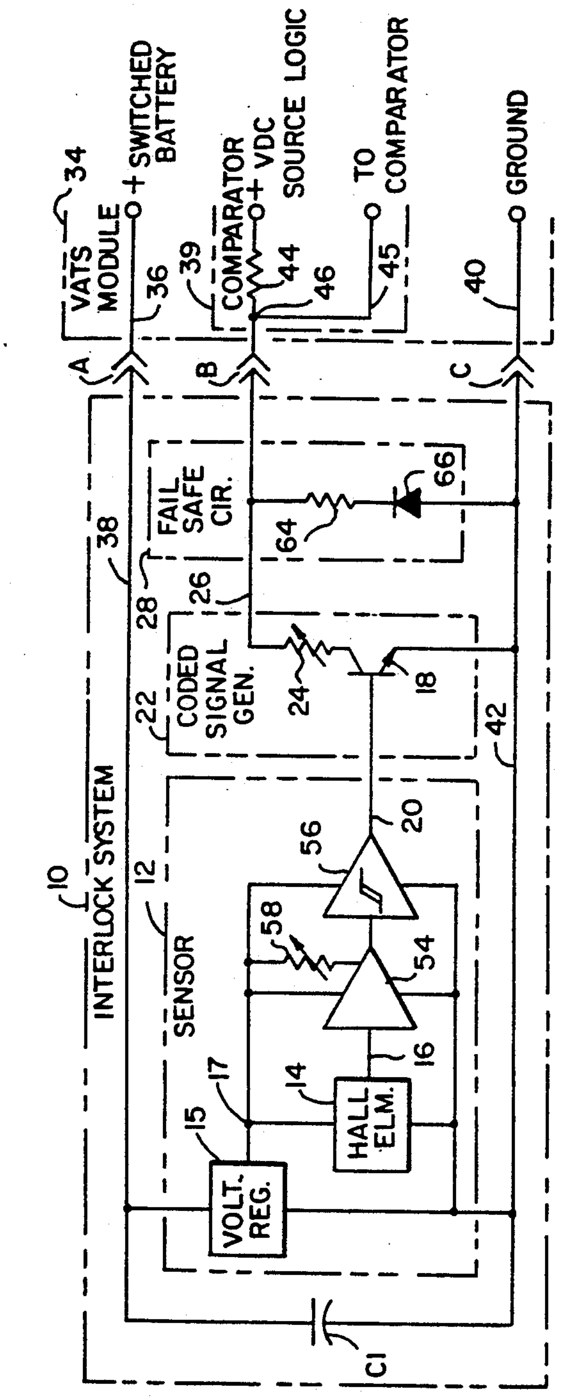
FIG. 3 is a diagrammatic illustration of an electronic interlocking circuity with a diode switched fail safe blocking circuit in parallel with the coded signal generator, in accordance with the present invention.
Figure 4:
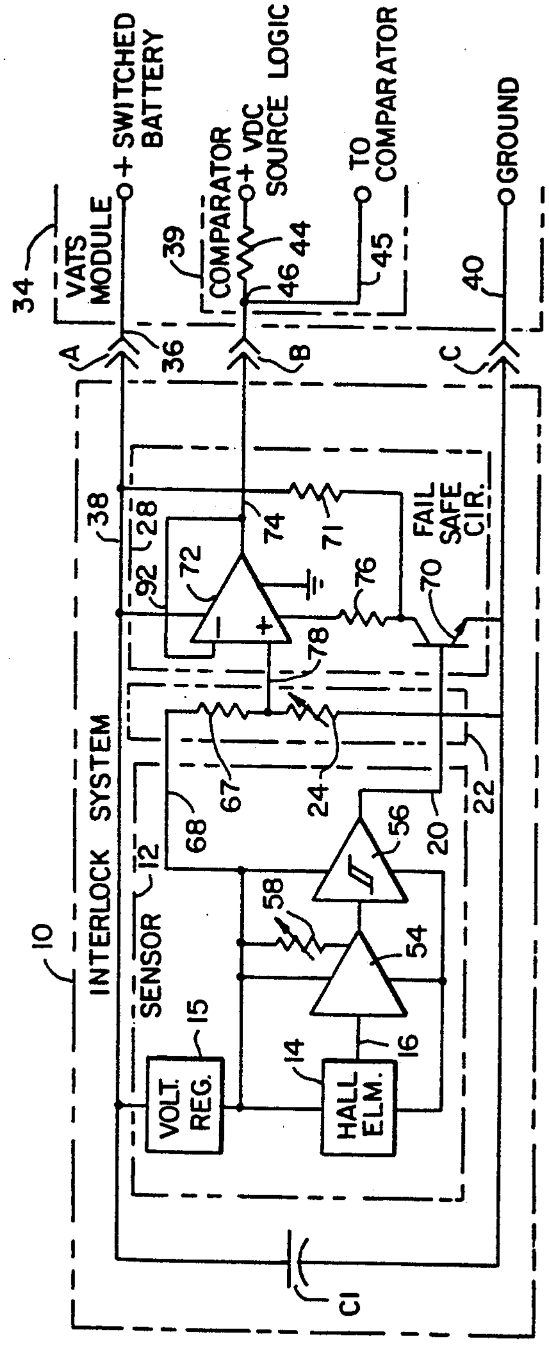
FIG. 4 is a diagrammatic illustration of an electronic interlocking system having a reflective fail safe blocking circuit which includes an operational amplifier to provide a reflective coded output signal, in accordance with the subject invention.
Figure 5:
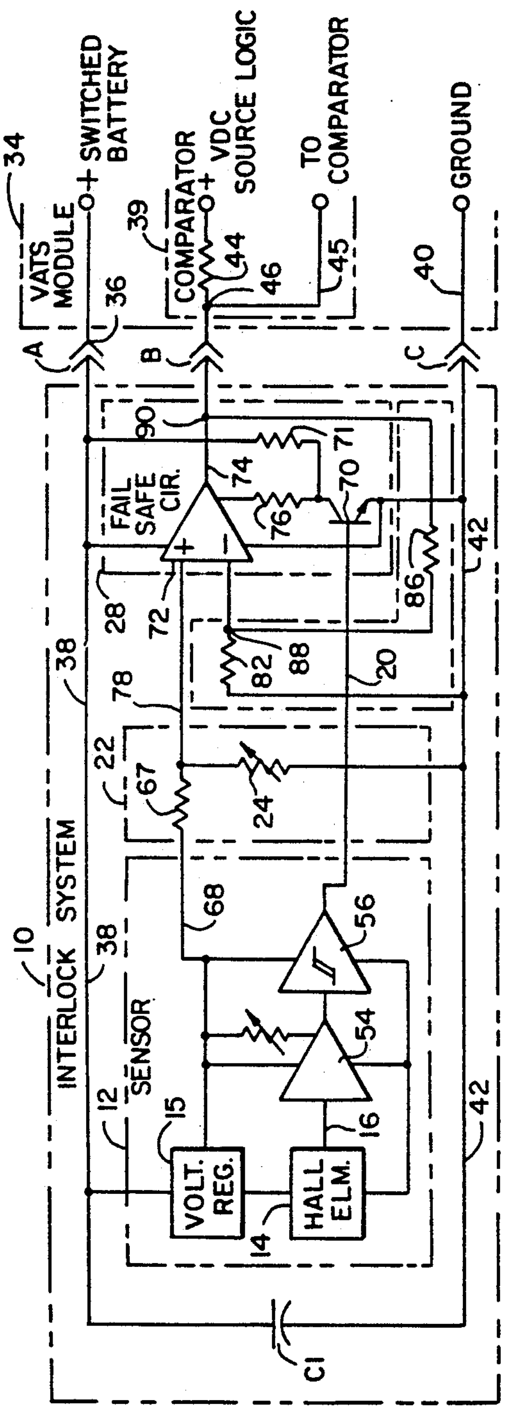
FIG. 5 is a diagrammatic illustration of an electronic interlock system similar to that shown in FIG. 4 and including a negative feedback loop to provide an amplified reflective coded output signal.
Figure 6:
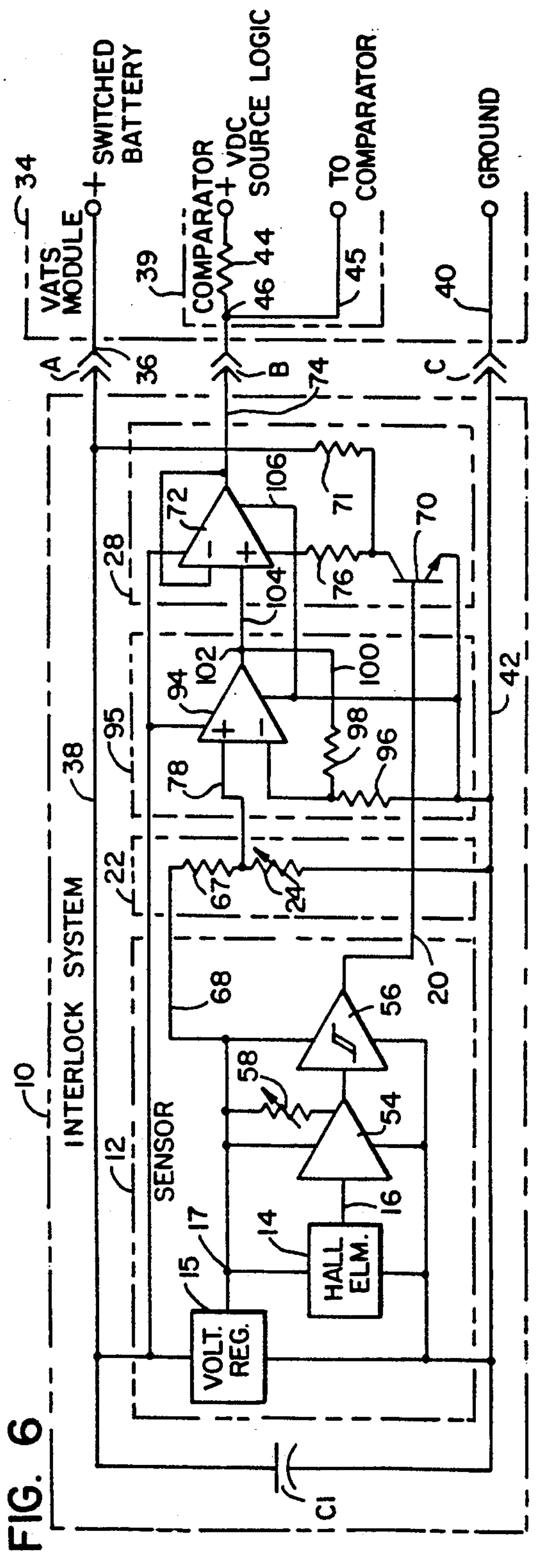
FIG. 6 is a diagrammatic illustration of an electronic interlock system having a reflective transistor switched fail safe blocking circuit utilizing a plurality of operational amplifiers to provide a reflective coded output signal.

Turning now to the improvements provided by the present invention and as illustrated in FIGS. 2-6, the VATS module 34 illustrated in FIGS. 2-6 is identical to that illustrated in FIG. 1 and is coupled to the interlock system 10 of each embodiment via the common terminals A, B and C. The sensor circuit 12, coded signal generator circuit 22 and fail safe blocking circuit 28 of each of embodiments shown in FIGS. 2-6 have the same operational purpose as the like numbered circuits in FIG. 1, and where the components are identical, the same reference numerals are used. However, each of the circuits have been modified to overcome the stated disadvantages of the interlock system of the prior art as shown in FIG. 1. In particular, it will be noted that the fail safe blocking circuitry 28 of each of the embodiments of FIGS. 2 and 3 is in parallel with the coded signal generator 22 in order to overcome the specific disadvantages associated with series fail safe blocking circuits of the prior art by providing a blocking circuit which is in a passive mode during normal operation. The fail safe blocking circuitry of FIGS. 4, 5 and 6 are reflective circuits which isolate the coded signal generator from the output terminals, rendering it impossible to read the coded signal through use of a reverse voltage.

With specific reference to FIG. 2, the sensor circuit 12 and coded signal generator 22 are identical to the embodiment illustrated in FIG. 1. The fail safe blocking circuitry 28 is a passive parallel circuit including a transistor switch 62 in series with a resistor 64. In the normal operating mode, the fail safe blocking circuit 28 is deactivated and is thus, disengaged from the interlock system, providing a true reading at terminal B of the coded ignition activation signal generated by the voltage drop across resistor 24. In the event an unauthorized attempt to read the value of resistor 24 is made by placing a reverse voltage across terminals B and C, the transistor switch 62 of the fail safe blocking circuit 28 will be energized passing current through resistor 64, providing a false reading across terminals B and C, making it impractical, if not impossible, to determine the value of the coding resistor 24.

In the embodiment of FIG. 3, the sensor circuit 12 and the coded signal generator circuit 22 are identical to the embodiment illustrated in FIG. 2. The fail safe blocking circuitry 28 has been modified to include a diode 66 in place of the transistor switch 62. The passive diode 66 serves to block current flow and serves to disengage the fail safe resistor 64 from the interlock system circuitry during normal operation, providing a true coded signal on line 32 consistent with the voltage drop across the resistor 24 of the signal generator 22, as in FIG. 2. However, the diode 66 permits a current to pass through resistor 64 whenever a reverse voltage is applied across terminals B and C in an attempt to read the resistance value of the coding resistor 24, rendering it impractical, if not impossible, to determine the resistance value of the coding resistor 24.

The fail safe blocking circuits of the embodiments illustrated in FIGS. 4-6 all include operational amplifiers for reflecting the coded signal while isolating the coded signal generator from the output terminals. The circuits are switched "ON" during normal operation, for producing a reflected coded signal output at terminal B. The operational amplifier isolates the coded signal generator from the output terminal B, and in addition, are turned "OFF" when normal operation ceases, rendering it impractical, if not impossible, to read the coded signal by application of reverse voltage across terminals B and C.

With specific reference to FIG. 4, the coded signal generator 22 has been modified to include a fixed resistor 67. The resistor 67 is in series with the coding resistor 24 of the signal generator 22 and is tied to voltage regulator 15 via line 68. In operation, the voltage drop across coding resistor 24 is present whenever the battery of the vehicle is switched "ON" and power is supplied on line 38 to the voltage regulator 15. The Hall effect element 14, amplifier 54 and Schmitt trigger 56 are all in series to provide a latching signal output on line 20, which is introduced directly into the transistor switch 70 of the fail safe circuit 28. As in previous embodiments, the transistor switched fail safe blocking circuit is not in series with the coding resistor 24. Whenever the Hall effect element generates a signal on line 16 in response to rotation of the cylinder, as previously described, a latched output signal is presented on line 20 to turn ON the transistor switch 70. The unity feedback loop 92 balances the input and output levels of the amplifier 72.

The fail safe blocking circuit is a strobed unity gain follower as defined by the transistor 70 and the resistor element 76 between the output of transistor switch 70 and the activation terminal of the operational amplifier 72. Resistor 71 is tied directly to power line 38 and is inserted between transistor 70 and resistor 76 to provide stability. The operational amplifier 72 is turned ON when the transistor 70 is energized by the presence of a signal on line 20. When the strobe is turned ON, the operational amplifier 72 is activated, and the coded signal generated by the voltage drop across resistor 24 is reflected and reproduced on line 74 and at terminal B. The amplifier 72 is functional to provide a true open circuit when the transistor 70 is in an OFF condition, turning the amplifier OFF and creating a tri-stated open condition, in the manner well known to those skilled in the art. When this occurs, a reverse voltage across terminals B and C results in an uncorrelated reading, unrelated to the coding resistor 24, rendering it impossible to determine the value of the coded voltage.

A further modification to the fail safe blocking network 28 of FIG. 4 is illustrated in FIG. 5, the unity gain follower being replaced by a non-inverting amplifier. As there shown, one side of the resistor 24 in the coded signal generator 22 is introduced into the positive input of the operational amplifier 72 via line 78. The opposite side of resistor 24 is tied to ground. The negative input of operational amplifier 72 is tied to ground via resistor 82 and to a negative feedback loop via resistor 86 and junctions 88 and 90. The positive feedback loop 92 present in the FIG. 4 has been deleted.

This particular embodiment of the circuit is useful when a plurality of windows is required and is accomplished by using different coding resistors 24 to provide a plurality of coded ignition activation signals at terminal B. The total voltage range encompassing the full spectrum of windows is limited by the voltage regulator 15, as in FIG. 4. The output side of the operational amplifier at line 74 is enhanced by the presence of the voltage divider network created by resistors 86 and 82. Specifically, the voltage divider network generated by the resistors 86 and 82 multiply the signal on the positive input side of the operational amplifier by the factor: $1+(R86/R82)$. This increases the number of voltage windows without requiring an increase in the voltage input range which is available from the voltage regulator 15 of the sensor circuit to the coding resistor 24. The specific multiplier is arbitrary and is dependent on application, as will be readily understood by those skilled in the art.

A final iteration of the preferred embodiment of the invention is illustrated in FIG. 6. As there shown, the signal generator 22 includes fixed resistor 67 which is tied directly to the coding resistor 24. The signal generator 22 is in communication with a pre-amp 95 comprising operational amplifier 94, which is in advance of the reflective fail safe circuit 28. Operational amplifier 72 is connected to the transistor switch 70 with resistor 76, as in FIG. 4. Line 78 on the positive side of resistor 24 is tied to the plus input of the non-inverting amplifier 94. A voltage divider network comprising resistors 96 and 98 is tied to the negative input of the non-inverting amplifier 94, and via line 100 and junction 102, to the output side of operational amplifier 94 on line 104. Line 104 is tied directly to the positive input side of the operational amplifier 72.

As in the embodiments of FIGS. 4 and 5, when the Schmitt trigger circuit 56 produces an output on line 20, this is introduced into the transistor switch 70 for activating the unity gain follower 72 through strobe resistor 76. Operational amplifier 94 is provided in the circuit to amplify the voltage drop across the coding resistor 24 at its output on line 104, which is then introduced into operational amplifier 72. This produces an amplified output on the fail safe blocking circuit output line 74 at terminal B.

The purpose of the pre-amp operational amplifier 94 is to provide an increased upper voltage limit to enlarge the number of available windows otherwise limited by the voltage regulator 15. The voltage divider network created by the resistors 96 and 98 functions in much the same manner as the voltage divider network created by the resistors 82 and 86 of the FIG. 5 embodiment. Moreover, using this circuit to enhance the size of the output voltage available eliminates the possibility of any leakage from the output side of operational amplifier 72 at line 74 back through resistor 86 and resistor 82 (see FIG. 5) to ground. That is, the output line 74 of the fail safe blocking circuit is isolated from the input line 78 tied to the coding resistor 24 by use of the pre-amplifier 94.

Each of the various embodiments of the circuit as here described and as shown in FIGS. 2–6 have particular application depending on the degree of accuracy required and the types of environmental conditions to which the circuit is exposed. All are functionally acceptable for specific applications. As the circuit becomes more sophisticated to eliminate leakage or enhance the output signals through amplification, the operational characteristics meet different criteria. The less expensive designs are desirable in applications where cost is an important consideration in the design equation. All circuits meet the common objectives of deleting active elements from the coded signal loop while providing effective blocking circuits for rendering it impractical, if not impossible to read the coded signal through the application of reverse voltage on the interlock output terminals.

While specific features and embodiments of the invention have been described in detail herein, it will be readily understood that the invention encompasses all alternatives and modifications within the scope and spirit of the following claims.

I claim:

1. A fail safe circuit adapted for preventing the deciphering of a coded electronic interlock for a mechanical lock, the lock having a rotatable cylinder and a mated key applicable in a normal mode for unlocking a system when the mated key is inserted in the cylinder and the key and cylinder are rotated from a locked position to an unlocked position, the interlock precluding enabling of the system until a preselected activation signal is generated in response to the rotation of the key and cylinder, the interlock including a sensor for determining the rotation of the cylinder and the key, and a signal generator having a preselected activation code controlled by the sensor for generating a system activation signal in response to the rotation of the cylinder and key, the fail safe circuit being in communication with said signal generator, said fail safe circuit adapted for preventing the unauthorized reading of the value of the preselected code when a mated key is not present in the cylinder of the mechanical lock, the fail safe circuit comprising:

a. a transistor switch circuit in communication with the signal generator and operable when the key is not present in the cylinder; and b. an amplifier circuit for receiving said activation signal when said transistor switch is operable, the amplifier circuit adapted for isolating the signal generator from the circuit and providing a false signal when an attempt is made to read the coded activation signal of the generator without inserting a mated key in the cylinder and rotating the key and cylinder.

2. The fail safe circuit of claim 1, further comprising a comparator circuit in communication with said signal generator for receiving the system activation signal, said comparator circuit operable for unlocking said system when the system activation signal is within an acceptable range.

3. The fail safe circuit of claim 1, wherein said fail safe device further includes a strobe element adapted for tri-stating the reflective circuit for providing a true open circuit when not energized.

4. The fail safe circuit of claim 3, further including a multiplier feed back loop with the amplifier circuit for multiplying the level of the activation signal.

5. The fail safe circuit of claim 3, further including a multiplying pre-amplifier circuit in advance of the reflective circuit for both amplifying and isolating the activation signal generated by said generator.

6. The fail safe circuit of claim 1, wherein said sensor further includes a Hall effect element for reading the presence of a magnetic field, and wherein said cylinder includes a permanent magnet located on the outer periphery thereof which is rotated in the proximity of the Hall effect element when the cylinder is properly rotated.

7. A fail safe circuit adapted for preventing the deciphering of a coded electronic interlock for a mechanical lock, the lock having a rotatable cylinder and a mated key operable in a normal mode for unlocking a system when the mated key is inserted in the cylinder and the key and cylinder are rotated from a locked position to an unlocked position, the interlock precluding the enabling of the system until a preselected resistance element is activated for a coded signal in response to the rotation of the key and cylinder, the interlock including a sensor for determining the rotation of the cylinder and key and a signal generator for activating the preselected resistance element for generating an ignition activation signal in response to rotation of the cylinder and key, the fail safe circuit being in communication with the signal generator and operable for preventing the unauthorized reading of the value of the preselected resistance element when a mated key is not present in the cylinder of the mechanical lock and the cylinder is not properly rotated, the fail safe device comprising:

a by-pass circuit disposed in parallel with the signal generator and the preselected resistance element and dormant when the cylinder is rotated to generate the activation signal and active when an attempt is made to read the preselected resistance element without rotating the cylinder for generating a false signal.

8. The fail safe circuit of claim 7, wherein said cylinder includes a permanent magnet mounted on the periphery thereof and wherein said sensor includes a Hall effect element which generates a signal in response to the proximity of the magnet relative to the sensor.

9. The fail safe circuit of claim 7, wherein said passive bypass circuit includes a diode triggered circuit, wherein the diode disengages said circuit when the cylinder is properly rotated and engages said circuit when an attempt is made to read the coded resistance value of the signal generator without rotating the cylinder.

10. The fail safe circuit of claim 7, wherein said passive bypass circuit includes a transistor switch circuit, the circuit having an ON mode and an OFF mode, the circuit normally turned OFF when the cylinder is properly rotated and turned ON to activate the bypass circuit in response to an attempt to read the coded resistance value of the signal generator without rotating the cylinder.

* * * * *